United States Patent [19]

Russell

[11] 3,848,094

[45] Nov. 12, 1974

[54] TELEPHONE BATTERY FEED CIRCUIT

[75] Inventor: Stanley L. Russell, Webster, N.Y.

[73] Assignee: Stromberg-Carlson Corporation, Rochester, N.Y.

[22] Filed: Dec. 29, 1972

[21] Appl. No.: 319,243

[52] U.S. Cl. .......................... 179/18 FA, 179/18 EB

[51] Int. Cl. .......................................... H04m 3/22

[58] Field of Search .......... 179/18 F, 18 FA, 18 EB, 179/16 H, 175.2 A, 175.2 C, 16 AA, 16 E, 16 EA, 84 L

[56] References Cited

UNITED STATES PATENTS

| | | | |
|---|---|---|---|
| 2,877,405 | 3/1959 | Morton | 324/28 |
| 3,544,724 | 12/1970 | Pento | 179/16 E |
| 3,596,011 | 7/1971 | Alexandrovich | 179/170.2 |

FOREIGN PATENTS OR APPLICATIONS

| | | | |
|---|---|---|---|
| 1,312,468 | 10/1961 | France | 179/18 F |

OTHER PUBLICATIONS

Electronics Magazine, June 28, 1963, page 32, "Look What Optical Semiconductors Do Now", by Michael F. Wolff.

*Primary Examiner*—Kathleen H. Claffy
*Assistant Examiner*—C. T. Bartz
*Attorney, Agent, or Firm*—William F. Porter, Jr.

[57] ABSTRACT

A telephone system battery feed circuit including an optoelectronic coupler for providing direct current flow to a telephone loop connected thereto and for detecting various supervisory signals transmitted over the telephone loop including a timing circuit for distinguishing between the various detected supervisory signals.

11 Claims, 4 Drawing Figures

TELEPHONE BATTERY FEED CIRCUIT

This invention pertains to telephone circuits in general, and more particularly to battery feed circuits for telephone systems for providing direct current (DC) battery potential to telephone loop connections and for detecting supervisory signals such as off hook, on hook, dial, and hook flash signals.

BACKGROUND OF THE INVENTION

All telephone systems have the common requirement of having a plurality of telephone sets remotely located from the switching equipment which selects and completes the connection between various telephone sets. As a general rule, these telephone sets do not have their own power sources. Power is provided to the telephone sets via the tip and ring lines which extend from the switching exchange to each telephone set. The point from which the telephone system provides power to the telephone sets depends upon the type of system involved. For example, in step-by-step systems the power supply point varies as the call progresses through the switching system, i.e., as the call is being set up. For example, in a step-by-step system, the initial source of power for the telephone instrument when the telephone set initially goes off hook is the line circuit. When the line circuit has detected the off hook condition it calls in the line finder circuit which, in turn, calls in a selector circuit; the selector circuit thereafter supplies the power to the telephone instrument. As the subscriber dials, the switching equipment now switches via the selector circuit to connector circuits or an outgoing trunk circuit. Therefore, as the number is dialed, the source of power is switched from one circuit to the next circuit until the last digit is dialed, at which time a connector circuit or a trunk circuit provides the power for the telephone set for the duration of the connection. The connector or trunk circuit will also supply power to the called party or trunk in the called switching system. Once the line finder circuit and the selector circuits used in setting up the connection have completed their function, the battery feed circuits are dropped out and are not used for any other purposes until the call is terminated and a subsequent connection is requested. In effect, there are a plurality of battery feed circuits required to function in the setup of a call, and once the call is completed, these circuits are held in a standby condition for the duration of the call.

In common control systems such as the type described in a copending patent application, Now U.S. Pat. No. 3,729,593 entitled, "Path Finding System" issued to Otto Altenburger and Robert H. Bansemir, when a calling party goes off hook, the power to the telephone set is initially supplied from a battery feed circuit in a register circuit. After all the dial pulses have been registered, the register circuit drops out and a junctor circuit takes control wherein the power to the calling telephone set is thereafter provided from a battery feed circuit in the junctor circuit. A second battery feed circuit is also included in the junctor circuit for providing battery power to the called party once the called party goes off hook, or to a trunk circuit once the trunk circuit is seized.

As can be seen, both the step-by-step systems and the common control systems require a large number of battery feed circuits. In addition, in a step-by-step system, when a connection has been completed the battery feed circuits used in establishing the connections are held in an idle condition until the call is terminated. Hence, due to the large number of battery feed circuits in any telephone system it can be readily seen that it would be highly advantageous if battery feed circuits could be provided on an economical, yet space saving arrangement and still provide the necessary power supplying and supervision functions. An all solid state battery feed circuit would be highly advantageous for a plurality of reasons. Among the reasons is that a reduced size which could be possible. In the present technology almost all of the battery feed circuits include a relay or a memory core circuit. The relay or memory core circuits as a result of being bulky and large in size, generally do not lend to fabrication by the use of automatic printed circuit card manufacturing techniques. The relay or core sensor in conventional battery feed circuits are used for isolation purposes. It is highly desirable that the battery feed circuit be electrically isolated from the remainder of the control circuits, particularly so in the common control systems, so that in the event of high transient signals in a telephone loop connection such as, for example, caused by lightning or switching of inductive devices, the transient signals will not be transmitted to the control equipment.

In recent years there has been an increased emphasis on the use of more sensitive and faster responding control devices in telephone systems to provide improved service. For example, saturable reactors and lower inertia and faster responding pulsing relays are presently being applied to such battery feed circuits to provide the faster response. These battery feed circuits can be connected by the switching system to any one of a large number of telephone lines. Each telephone line generally presents different electrical characteristics depending upon its length, gauge, leakage, connected telephone set. Each telephone line, therefore, presents a different value of capacitance, inductance and resistance between the subscribers dial and the associated battery feed circuit so that the operating conditions of the battery feed circuit changes with each telephone line connection. Furthermore, due to the high cost of copper, there is a general tendency to use smaller diameter conductors to reduce costs. However, the telephone lines including the smaller conductors having a higher resistance per unit length and may at times exhibit higher capacitance per unit length. Therefore the length of such telephone lines becomes an increasingly important factor in determining the electrical characteristics of the telephone loop. The various reactive components including the saturable core and the relays tend to interact to apply distorted current pulses through the loop circuit resulting in improper circuit operation and in the case of pulsing relays enhance the conditions under which undesirable spurious contact closures are generated. It would therefore be highly advantageous if the inductive reactances in the battery feed circuit could be minimized.

Sensitive control devices, under various conditions, tend to produce erroneous output pulses that at times exceed acceptable limits, and in the case of relays tend to produce undesirable spurious or additional contact closures. In the standard step-by-step switching systems, the inertia of the switching relays is such that the spurious contact closures (within limits) generally do not create problems. However, in electronic switching systems and step-by-step system modified to include electronic switching circuits, the response time may be such that the circuit will incorrectly respond to distorted current pulses and/or spurious contact closures and result in erroneous switching. A circuit for overcoming some of the problems concerned with the response time of relays and saturable cores and for reducing the effect of the reactive components in a telephone line and sets is disclosed in a U.S. Pat. No. 3,610,826, entitled, "Selectively Shunted Relay Pulsing Circuit" filed for Charles A. Furmusa and William E. Shaffer.

It is therefore an object of this invention to provide a new and improved battery feed circuit for telephone systems.

It is also an object of this invention to provide a new and improved battery feed circuit for telephone systems that does not include a relay or saturable reactor switching device.

It is still a further object of this invention to provide a new and improved battery feed circuit for telephone systems that substitutes semiconductor devices for reactive devices thereby providing a cost savings circuit arrangement that is readily adaptable for manufacture by automatic techniques.

It is also an object of this invention to provide a new and improved battery feed system for telephone systems that substitutes semiconductor devices for reactive devices and still provides electrical isolation between the battery feed circuits and the control circuits connected thereto.

It is also an object of this invention to provide a new and improved battery feed circuit for telephone systems that rapidly responds to opened and closed loop circuit condition for accurately distinguishing between supervisory signals such as, off hook, on hook, dial, hook flash signals and rejects transient signals.

BRIEF DESCRIPTION OF THE INVENTION

A battery feed circuit for telephone systems including a pair of terminals for connection via tip and ring lines to a telephone set, and a second pair of terminals for connection to a direct current power supply. Circuit means provides a direct current path between the first and second pair of terminals that includes impedance means in series therewith that exhibits a substantially higher impedance to AC signals than to DC. A semiconductor device is connected to the direct current path to provide signals indicating the absence and presence of current flow through the direct current path. The semiconductor device includes an input circuit having a radiation source for providing photon radiation, the intensity of which, is a function of current flow therethrough, and a photon sensitive control device, the impedance of which, is a function of the intensity of radiation received from said source, the input and output circuits of the semiconductor device being electrically isolated from each other. The input circuit is connected to the direct current circuit so that the source is energized when the direct current path is conductive. The use of the semiconductor device provides a rapidly responding nonreactive means for sensing the current flow in the telephone loop and still provide the required degree of isolation between the telephone loop and the control circuitry connected to the battery feed circuit.

A further feature of the invention includes a counter circuit arrangement connected to the semiconductor device for distinguishing between supervisory signals such as, on hook, off hook, dial and hook flash signals and for rejecting transient signals.

DETAILED DESCRIPTION OF THE INVENTION

Figure 1:
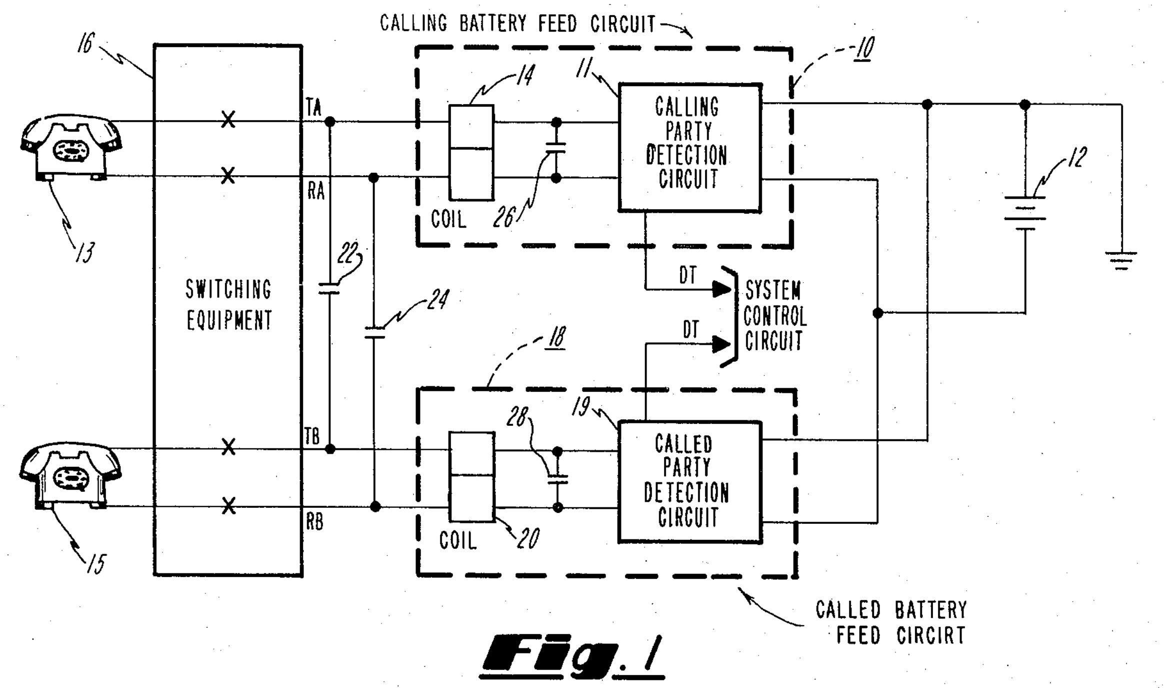
FIG. 1 is a simplified block diagram of a battery feed arrangement in a telephone system for providing power to the calling and called parties and for monitoring supervisory signals therefrom.

FIG. 1 is a block diagram of a usual telephone battery feed circuit arrangement wherein a separate source of power is provided to both the calling and called parties involved in a telephone connection via a junctor circuit such as that disclosed in a U.S. Pat. No. 3,705,268 entitled, "Passive Junctor Circuit And Selectively Associated Junctor Control" filed on Dec. 22, 1970, for Otto Altenberger for use in a common control system. The circuit of FIG. 1 also represents the battery feed arrangement in selector circuits and trunk circuits in the case of step-by-step systems. For the purpose of explaining the battery feed circuit arrangement of FIG. 1, the telephone set 13 is designated as the calling party that is initiating the connection, while the telephone set 15 is designated as the called party. However it is to be understood, that any telephone set can be either the calling or called party and its connection to the battery feed circuits depends on whether the particular telephone set is initiating a connection or answering a call. In addition to providing the power to the telephones connected thereto, the battery feed circuit detects supervisory signals such as for example, off hook, on hook, dial and hook flash signals. These supervisory signals are transmitted via lines DT to the system control circuits.

A calling battery feed circuit 10 supplies power from a DC power source 12 (illustrated as a battery) through a detection circuit 11 and dual coil impedance coil 14 to the tip (TA) and ring (RA) leads connected to the calling party telephone set 13 via the telephone switching equipment 16. In a similar manner, the called battery feed circuit 18 supplies power from the DC power source 12 through a detection circuit 19 and a dual coil impedance coil 20 to the tip (TB) and the ring (RB) leads connected through the telephone switching equipment 16 to the called telephone set 15. The impedance coils 14 and 20 exhibit a high impedance to the audio signals and a low impedance to DC thereby minimizing the AC loading affect of the battery feed circuits 10 and 18 on the tip and ring lines connected thereto. An audio path for voice signal transmission between telephone 13 and telephone 15 is provided by the capacitors 22 and 24. Although the audio path is illustrated as including the capacitors 22 and 24, it is to be understood that a transformer coupling can also be used. The capacitors 26 and 28 function as filters for audio signals.

Figure 2:
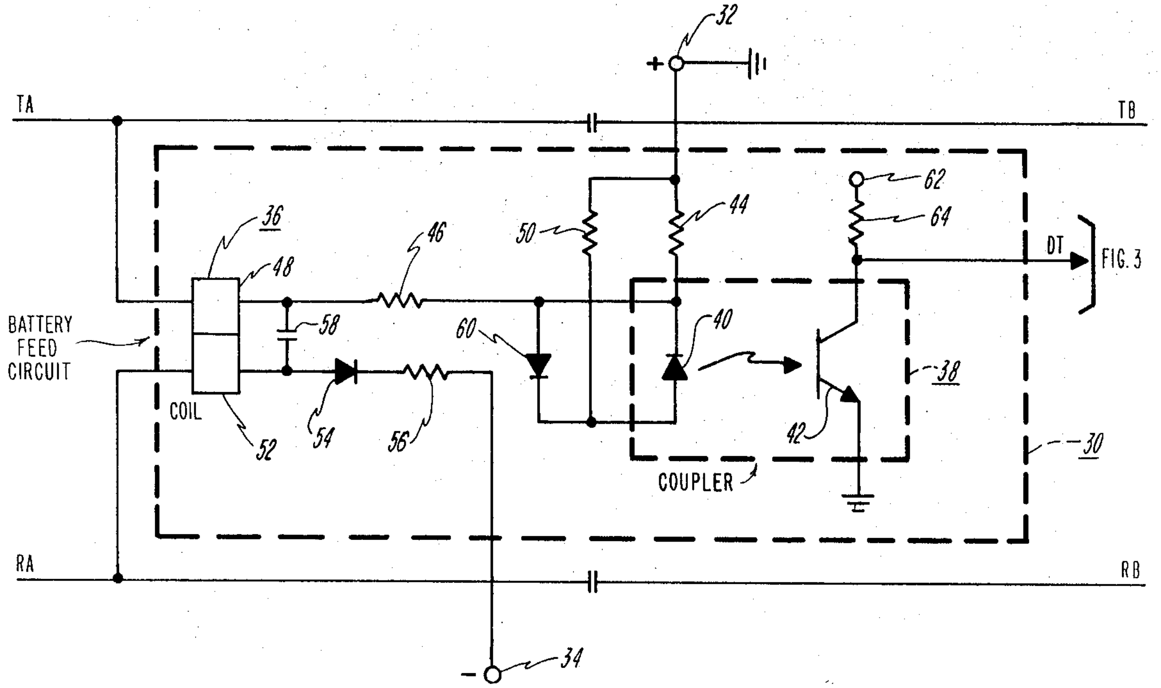
FIG. 2 discloses a battery feed circuit including an optoelectronic coupler in accordance with the teachings of the invention.

FIG. 2 includes a schematic diagram of a battery feed circuit 30, including the invention, that can function either as the calling battery feed circuit 10 or the called battery feed circuit 18. As in the case of the battery feed circuits of FIG. 1, the battery feed circuit 30 is connected between power supply terminals (32 and 34) and the tip (T) and ring (R) lines through a dual coil impedance coil 36. The detection circuit in battery feed circuit 30 includes a solid state optoelectronic coupler 38. The optoelectronic coupler 38 includes an input circuit having a photon radiation source, such as a light emitting diode (LED) 40, and an output circuit including a photon sensitive transistor 42, both of which are electrically isolated and included together in a hermetically sealed package. The radiation emitted from the diode 40 is transmitted onto the transistor 42 to perform the same control function as base current for rendering the usual transistor conductive. The operation of optoelectronic coupler is described in detail in an article entitled, "Look At What Optical Semiconductors Do Now" by Michael F. Wolff, pages 32–34 in the June 28, 1963 issue of "Electronics."

The cathode of the light emitting diode 40 is connected to the junction of two series resistors 44 and 46 connected between the tip line (T) and the positive terminal 32 of the power source (connected to ground) through a winding 48 of the impedance coil 36. The anode of the light emitting diode 40 is connected to the positive terminal 32 through a resistor 50. The ring line (R) is connected to the negative power terminal 34 through the other winding 52 of the impedance coil 36, a diode 54 and a resistor 56. The capacitor 58 provides AC filtering. The resistors 44, 46, 50 and 56, the diodes 40 and 54, and the windings 48 and 52 of the impedance coil 36 define the DC power feed circuit for a connected telephone loop. When a connected telephone set goes off hook, the loop is complete so that current flows from the positive terminal 32 through the parallel combination of the resistor 44 and the resistor 50 in series with the light emitting diode 40, the resistor 46, the winding 48 via the tip line (T) through the connected telephone set, and back through the ring line (R), winding 52, diode 54, resistor 56 to the negative power terminal 34. A balanced arrangement is preferred wherein the value of the resistor 56 equals the value of the resistor 46 plus the parallel value of the resistors 44 and 50.

A telephone set requires direct current in the order of 20 to 100 milliamps for proper operation. The parallel combination of the resistors 44 and 50 provides a current splitting circuit arrangement assuring sufficient current flow through the light emitting diode 40 when a telephone loop is complete, while at the same time providing sufficient current flow for proper telephone set operation without exceeding the design capabilities of the diode 40. For example, assuming: (1) the power supply has a potential of 48 volts, (2) the resistance value of resistor 56 is selected to be 200 ohms, (3) the resistor 46 is selected to equal 100 ohms, and (4) the gain of the optoelectronic coupler 38 is 0.66, the value of resistor 50 will be about twice that of resistor 44, i.e., approximately 300 ohms and 150 ohms respectively. This arrangement provides a balanced DC battery feed circuit from both the positive and negative terminals 32 and 34 of the power supply while also providing (over the normal range of expected loop current of 20 to 100 milliamps) sufficient current flow through the light emitting diode 40 to fully saturate the transistor 42. A diode 60 is connected across the light emitting diode 40 to protect the diode 40 against reverse voltages. The diode 54 is included in series with the resistor 56 to maintain circuit balance by compensating for the amount of forward voltage drop across the diode 40. The emitter of the transistor 42 is connected to ground while the collector is connected to a positive power supply terminal 62 via a resistor 64.

In response to an off hook condition in a connected telephone set the telephone loop circuit is completed and current flows from ground through the parallel resistors 44 and 50, (including diode 40) and through the resistor 46, winding 48, the tip lead and the telephone set and back via the ring lead R through the winding 52, the diode 54 and the resistor 56. The current flow through the light emitting diode 40 causes saturation of the transistor 42 driving the lead DT to ground. When the telephone loop is subsequently opened, the current through the light emitting diode 40 is interrupted and the transistor 42 is rendered nonconductive to provide a high signal on the lead DT. In effect, the output from the transistor 42 provides high and low signals on the lead DT corresponding to the open and closed circuit conditions, respectively, of the telephone loop connection.

Figure 3:
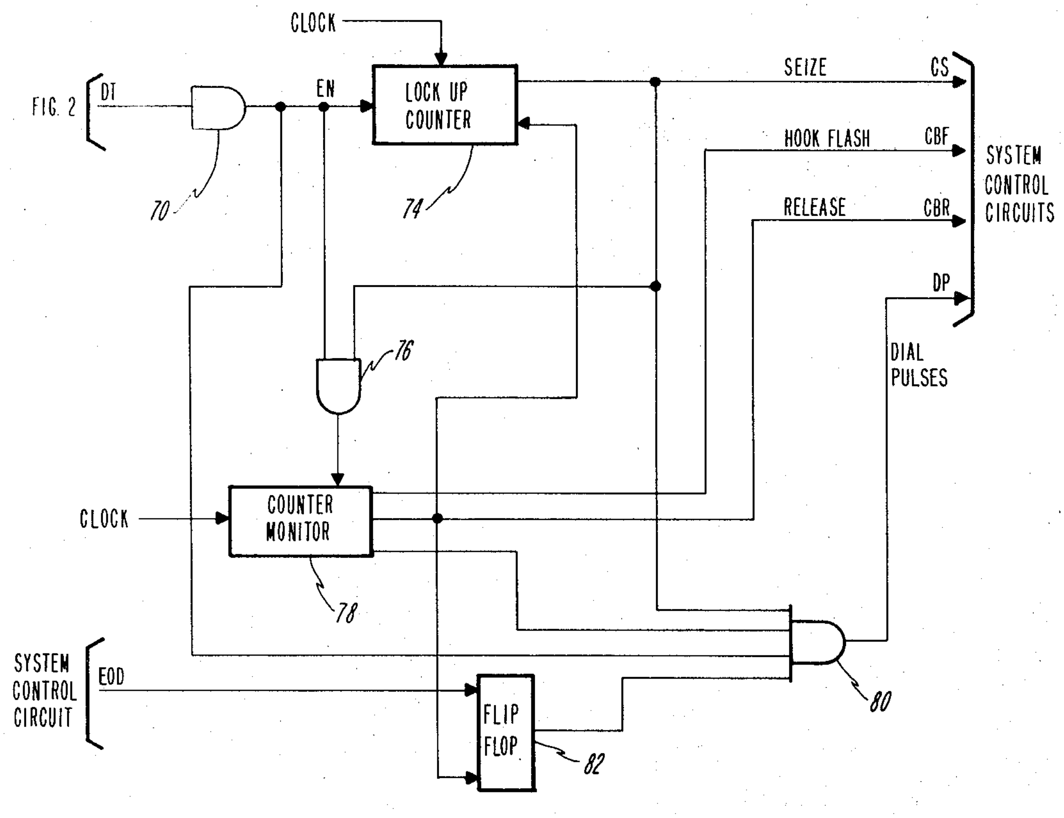
FIG. 3 includes a supervisory signal monitor circuit, responsive to the signals generated by the circuit of FIG. 2, for distinguishing between supervisory signals such as on hook, off hook, dial and hook flash signals while rejecting transient signals.

FIG. 3 includes a timing circuit for monitoring the signals on the lead DT for distinguishing between supervisory signals such as off hook, on hook, dial, hook flash, seizure and release signals and rejecting transient signals. When a completed loop circuit is detected, a ground signal on the lead DT is applied via an isolation inverter 70 to a lockup type counter circuit 74. The counter circuit 74 functions to time the presence of the ground signals under an initial off hook condition so that any transient signals in the loop circuit are rejected and thereby preventing the erroneous seizure of the circuit. A ground signal on the lead DT must be present for at least 5 to 10 milliseconds as determined by the lockup counter 74 and the clock pulses applied thereto. If a ground signal is present on the DT lead for the required preset number of counts, the counter reaches a self locking position and produces a seize signal on the lead CS. The seize indicates to the control circuitry that the lead DT has been at ground level for a sufficient period of time to indicate an off hook condition.

Figure 4:
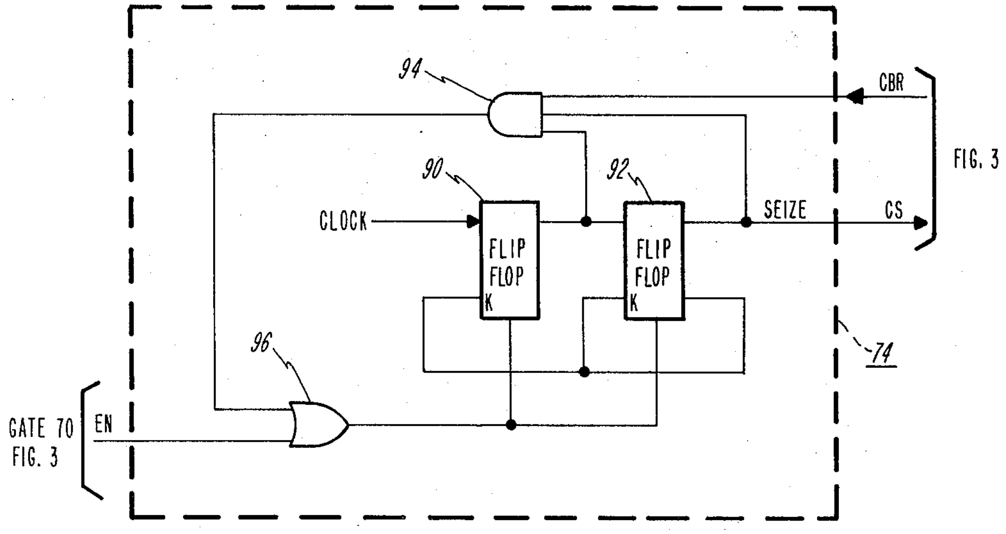
FIG. 4 includes a schematic diagram of the lockup counter of FIG. 3.

The lockup counter circuit 74 of FIG. 4 includes two flip-flop circuits 90 and 92 interconnected so that in response to an enable signal EN from the gate 70, via an OR gate 96, the flip-flop circuits 90 and 92 are cleared and proceed to count three clock pulses, at which time both flip-flops are locked in a "set" condition to produce the continuous seize signal signal on the line CS. An AND gate 94 is connected to the outputs of the flip-flops 90 and 92 and is connected to receive a release signal on lead CBR. When the count of three is reached, the arrangement is such that the gate 94 applies a signal to the OR gate 96 to inhibit any subsequent signals on the line EN from clearing the flip-flops 90 and 92. When the connection is terminated, a release signal on line CBR in combination with the "set" signals from flip-flops 90 and 92 switches the AND gate 94 to apply a temporary clear signal to the flip-flops 90 and 92 for resetting the flip-flops and preparing the lockup counter circuit to respond to a subsequent signal on the line EN indicating a new off hook condition.

The seize signal from the lockup counter 74 also enables an AND gate 76 to apply the signals from lead DT to a counter monitor circuit 78 to enable the circuit 78 to monitor any subsequent supervisory signals. As previously mentioned, the CS signal is present for the duration of the connection and until a release signal from the counter monitor circuit 78 is applied to the lockup counter 74. The counter monitor circuit 78 includes a standard binary type counter arrangement that is unlocked during the presence of a high signal on lead DT (corresponding to an open loop condition) and the presence of the CS signal (indicating the circuit is seized) to count clock pulses applied thereto. The counter monitor circuit 74 and the clock pulse rate is arranged so that a count corresponding to more than 1 to 2 milliseconds and less than 200 milliseconds indicates a dial pulse signal, a count corresponding to a period between 200 milliseconds to two seconds corresponds to a hook flash signal, while any count corresponding to a period of time greater than 2 seconds indicates a release condition.

After the control circuit has been seized and the calling party begins dialing, the open loop conditions will appear as sequential high signals on the lead DT. If a high signal is present at least 1 to 2 milliseconds, the counter monitor circuit 78 applies an enable signal to an input circuit of an AND gate 80. At the end of the dial pulse, the lead DT will go to ground resetting the counter monitor circuit 78 and the enable signal from the counter monitor circuit 78 is removed from the AND gate 80. Hence, the counter monitor circuit 78 monitors the duration of each of the open loop dial signals (highs) to determine that dial pulses are in fact being generated. A second input to the AND gate 80 is connected to the inverter circuit 70, a third input to the AND gate 80 is connected to receive the seize signal from the lockup counter 74, and a fourth input circuit to the AND gate 80 is connected to and end-of-dial flip-flop 82. The end-of-dial flip-flop 82 is normally switched to a reset condition by a release signal received from the counter monitor 78. Hence, with the seize and enable signals present, and the end-of-dial flip-flop reset, the dial pulse is repeated by the AND gate 80 on lead DP. When the control has received sufficient dial pulses for complete dialing, the system control applies an end-of-dial signal on the lead EOD, which, in turn, sets the flip-flop 82 and inhibits the gate 80 from repeating any further high signals on lead DP.

In the event that the loop is opened for a period of time indicating a hook flash condition, the signal on lead DT will be high for a sufficient period of time so that a count is reached by the counter monitor circuit 78 designating a hook flash condition and therefore a hook flash signal is generated on the lead CBF. In the event that the connected party hangs up, a signal on the lead DT will be high for a sufficient period of time to allow the counter monitor circuit 78 to indicate a count greater than two seconds and will therefore generate a release signal on the lead CBR. Hence, as can be seen, the timing circuit of FIG. 3 provides a means by which the transient signals in the loop are rejected, and also provides a means by which the supervisory signals such as off hook, on hook, dial, hook flash, release, seizure, etc., are properly identified.

The use of the optoelectronic coupler 38 in the battery feed circuit of the invention reduces the amount of reactive impedance in the telephone loop connection and thereby reduces pulse distortion and provides for more accurate signalling. In addition, since the optoelectronic coupler 38 is not dependent upon any magnetic characteristics for operation, but depends upon photoelectronic characteristics which provides a response time in the order of two through twelve microseconds. This response is far superior to the relay or magnetic core sensor circuits of the prior art, thereby repeating more accurately the supervisory signal on the telephone loop. Consequently, any opening or closing of a telephone loop is immediately detected and transmitted to the system control circuitry thereby eliminating the need for the pulse correction circuits of the prior art. In addition to the foregoing, the optoelectronic coupler 38 has an isolation level between the light emitting diode 40 and the transistor 42 that is in the order of 1,500 to 2,500 volts, which is comparable to the isolation between a relay coil and its closest associated contacts. Hence, for practical purposes, the battery feed circuit can be considered as electrically isolated from the system control circuits. The small size of the optoelectronic coupler 38 allows the battery feed circuit to be mounted on a printed circuit board with other low level logic circuits so that automatic manufacturing techniques can be applied. In addition, the use of the optoelectronic coupler 38 provides a cost savings over the cost of the corresponding usual double wound relay or magnetic core sensor used in the battery feed circuit of the prior art. The use of the optoelectronic coupler eliminates the need for any AC signal source of the type generally required with the magnetic core sensor thereby eliminating the potential hazard of failure of all, or large number of, battery feed circuits in the event that an AC source should happen to fail. Any failure in the battery feed circuit in the present invention will only eliminate that particular battery feed circuit.

What is claimed is:

1. A battery feed circuit for connection by telephone switching equipment to a telephone set for providing power thereto and for detecting supervisory signals therefrom, said battery feed comprising:

a first pair of terminals for connection to a direct current power supply;

a second pair of terminals for connection to the telephone switching equipment;

a semiconductor device including an input circuit having a radiation source that generates photon radiation, the intensity of which is a function of current flow therethrough, and an output circuit having a radiation sensitive device, the impedance of which is a function of the intensity of the radiation from said source, said input and output circuit being electrically isolated;

impedance means, having a direct current path therethrough, and exhibiting a substantially higher impedance to audio frequency current than to direct current, for blocking audio current to said first pair of terminals;

direct current circuit means for connecting said first pair of terminals to said second pair of terminals through said impedance means to provide a direct current path therebetween, and said input circuit being connected between said impedance means and said first pair of terminals so that said semiconductor device provides signals indicating the conductive and non-conductive conditions of said direct current path.

2. A battery feed circuit as defined in claim 1 wherein:
said direct current circuit means includes first and second resistance means connected in series with each other and said direct current path and connected to one of said first pair of terminals;
the input circuit of said semiconductor device is connected between the junction of said first and second resistance means and the one of said first pair of terminals connected thereto, and
said direct current circuit means includes a third resistance means connected in series with said direct current path and the other one of said first terminal pair.

3. A battery feed circuit as defined in claim 1 including:
timing circuit means connected to receive signals from said semiconductor device for distinguishing transient signals from supervisory signals.

4. A battery feed circuit as defined in claim 3 wherein:
said timing circuit means includes counting circuit means for distinguishing between dial, hook flash, off hook, and on hook type supervisory signals.

5. A battery feed circuit as defined in claim 2 wherein:
said radiation source is a light emitting diode, and
said radiation sensitive device is a light sensitive transistor.

6. A battery feed circuit for applying power from a direct current power supply to a telephone set connected thereto by telephone switching equipment, and for detecting supervisory signals, said battery feed circuit comprising:
an impedance coil able to pass direct current and substantially block audio frequency current therethrough;
direct current circuit means for providing a direct current path between the power supply and the telephone switching equipment through said impedance coil;
an optoelectronic coupler;
circuit means connecting said optoelectronic coupler to said direct current path between said coil and said power supply so taht said optoelectronic coupler provides signals indicating the conductive and nonconductive conditions of said direct current path, and
timing circuit means connected to said optoelectronic coupler for distinguishing between dial, on hook, off hook, hook flash signals, and for rejecting transient signals.

7. A battery feed circuit as defined in claim 6 wherein:
said optoelectronic coupler connection circuit means connects the optoelectronic coupler to said direct current path so that said optoelectronic coupler is conductive when the direct current path is in a conductive condition.

8. A battery feed circuit for connection by telephone switching equipment to a telephone set for providing power thereto and for detecting supervisory signals therefrom, said battery feed comprising:
a first pair of terminals for connection to a direct current power supply;
a second pair of terminals for connection to the telephone switching equipment;
a semiconductor device including an input circuit having a radiation source that generates photon radiation, the intensity of which is a function of current flow therethrough, and an output circuit having a radiation sensitive device, the impedance of which is a function of the intensity of the radiation from said source, said input and output circuit being electrically isolated;
impedance means, having a direct current path therethrough and exhibiting a substantially higher impedance to audio frequency current than to direct current, for blocking audio current to said first pair of terminals;
direct current circuit means for connecting said first pair of terminals to said second pair of terminals through said impedance means to provide a direct current path therebetween;
said input circuit being connected between said impedance means and said first pair of terminals so that said semiconductor device provides signals indicating the conductive and nonconductive conditions of said direct current path;
timing circuit means connected to receive signals from said semiconductor device for distinguishing transient signals from supervisory signals;
said timing circuit means includes counting circuit means for distinguishing between dial, hook flash, off hook, and on hook type supervisory signals;
a lockup counter circuit for determining when the semiconductor device has been conductive for a sufficient period of time to indicate an off hook condition and provides a continuous signal thereafter until released, and
a counting circuit, responsive to said continuous signal, for determining the period of time the semiconductor device is nonconductive thereafter, to differentiate between dial, hook flash, on hook and off hook type supervisory signals.

9. A battery feed circuit as defined in claim 8 wherein said counting circuit means includes:
circuit means responsive to the dial signals from said counter circuit for repeating the dial signals, and
circuit means responsive to an end of dial signal for inhibiting said dial signal repeating circuit means.

10. A battery feed circuit for applying power from a direct current power supply to a telephone set connected thereto by telephone switching equipment, and for detecting supervisory signals, said battery feed circuit comprising:
an impedance coil able to pass direct current and substantially block audio frequency current therethrough;
direct current circuit means for providing a direct current path between the power supply and the telephone switching equipment through said impedance coil;
an optoelectronic coupler;
circuit means connecting said optoelectronic coupler to said direct current path between said coil and said power supply so that said optoelectronic coupler provides signals indicating the conductive and nonconductive conditions of said direct current path;

said optoelectronic coupler connection circuit means connects the optoelectronic coupler to said direct current path so that said optoelectronic coupler is conductive when direct current path is in a conductive condition;

a lockup counter circuit for determining when said optoelectronic coupler has been rendered conductive for a sufficient period of time to indicate an initial off hook condition and provides the continuous signal thereafter until released by an on hook signal, and counting circuit means responsive to said continuous signal, for determining the period of time said optoelectronic coupler is nonconductive thereafter, to differentiate between dial, hook flash, on hook and off hook supervisory signals.

11. A battery feed circuit for connection by telephone equipment to a telephone set for providing power thereto and for detecting supervisory signals therefrom, said battery feed comprising:

a first pair of terminals for connection to a direct current power supply;

a second pair of terminals for connection to the telephone switching equipment;

a semiconductor device including an input circuit having a radiation source that generates photon radiation, the intensity of which is a function of current flow therethrough, and an output circuit having a radiation sensitive device, the impedance of which is a function of the intensity of the radiation from said source, said input and output circuit being electrically isolated;

impedance means, having a direct current path therethrough, and exhibiting a substantially higher impedance to audio frequency current than to direct current, for blocking audio current to said first pair of terminals;

direct current circuit means for connecting said first pair of terminals to said second pair of terminals through said impedance means to provide a direct current path therebetween;

said input circuit being connected between said impedance means and said first pair of terminals so that said semiconductor device provides signals indicating the conductive and nonconductive conditions of said direct current path;

said direct current circuit means includes first and second resistance means connected in series with each other and said direct current path and connected to one of said first pair of terminals;

the input circuit of said semiconductor device is connected between the junction of said first and second resistance means and the one of said first pair of terminals connected thereto;

said direct current circuit means includes a third resistance means connected in series with said direct current path and the other one of said first terminal pair;

said input circuit includes fourth resistance means connected in series with said radiation device, and wherein the resistance value of the connection including the first resistance means and the parallel combination of the second and fourth resistance means is substantially equal to the resistance value of the third resistance means.

* * * * *